May 7, 1935. F. J. CASEY 2,000,219
DANDELION PULLER
Filed July 10, 1934
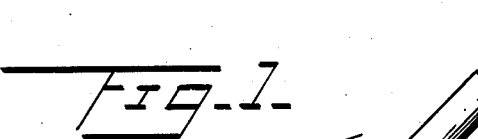
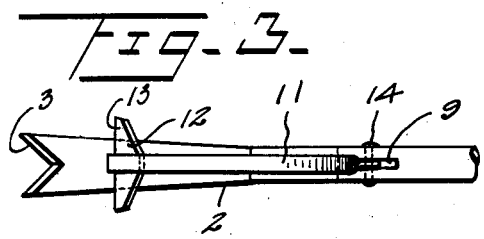
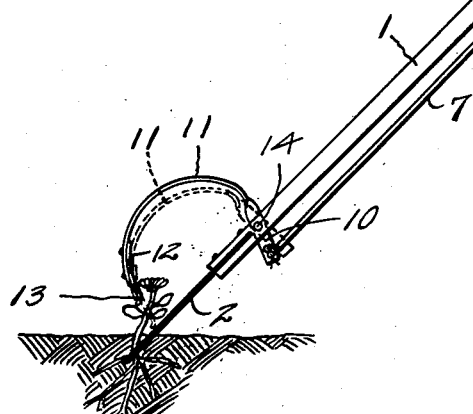
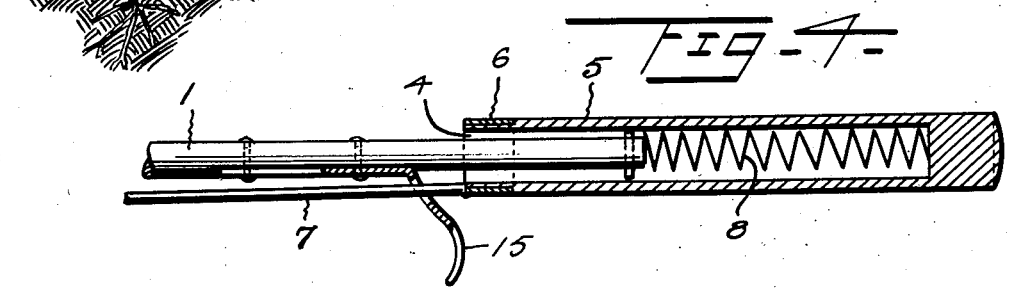
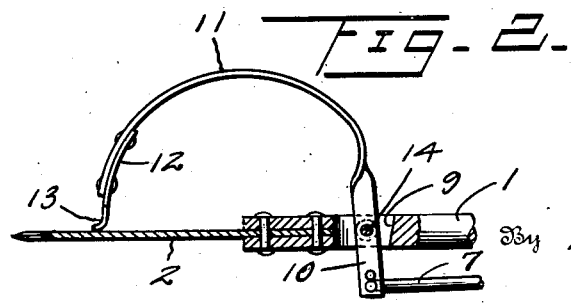
Inventor
F. J. Casey
By Watson E. Coleman
Attorney Patented May 7, 1935

2,000,219

UNITED STATES PATENT OFFICE 2,000,219

DANDELION PULLER

Frank J. Casey, Albion, Nebr.

Application July 10, 1934, Serial No. 734,551

4 Claims. (Cl. 55—148)

This invention relates to improvements in garden implements and pertains particularly to an implement for pulling weeds of the nature of dandelions.

The primary object of the present invention is to provide an implement by means of which dandelions or similar weeds may have their roots cut off and may be pulled from the ground, with ease and without the necessity of having to stoop over or otherwise exert oneself to any material degree.

Another object of the invention is to provide a device which in one operation will sever the root of a weed and at the same time grip the top of the weed so that when the device is retracted after being projected forwardly, the weed will be withdrawn from the ground and may be readily disposed of or will be released when the device is again projected toward and into the ground for the purpose of cutting the roots of another weed at which time, the first weed will be released and the second weed taken hold of.

A further object of the invention is to provide a weed pulling device having a knife and a gripping element which is so designed that when the knife is forced into the ground to cut the root of a weed, the gripping element will automatically take hold of the top of the weed so that the latter will be withdrawn when the knife is removed from the ground, and further having means associated with the gripping element and readily accessible to a finger of the hand holding the implement, whereby the gripping element may be actuated for the release of the weed when it is desired to discharge the weed into a receptacle.

The invention will be best understood from a consideration of the following detailed description taken in connection with the accompanying drawing from part of this specification, with the understanding, however, that the invention is not confined to any strict conformity with the showing of the drawing but may be changed or modified so long as such changes or modifications mark no material departure from the salient features of the invention as expressed in the appended claims.

In the drawing:

Fig. 1 is a view in side elevation of the device embodying the present invention.

Fig. 2 is a sectional view longitudinally through the forward end of the device, the portions of the same being in elevation.

Fig. 3 is a view in top plan of the forward end of the implement.

Fig. 4 is a longitudinal sectional view through the handle of the implement.

Referring to the drawing wherein like numerals of reference designate corresponding parts throughout the several views, the numeral 1 indicates a shaft which constitutes the main body portion of the present device and which at one end, has secured thereto and extending longitudinally therefrom, the blade 2 which is preferably of greatest width at its outer end and forked or formed with a V-shaped cutting edge 3.

At its opposite end, the shaft 1 extends into the open end 4 of a hollow tubular handle 5, the opposite end of which is closed, as shown. This hollow or tubular handle 5 has a ferrule 6 secured around its forward or open end, to which is integrally connected one end of a rod 7 which extends forwardly and parallel with the shaft 1. Within the hollow handle 5 is a coil spring 8 which bears at one end against the closed end of the handle and at its other end against the introduced end of the shaft 1, thus tending constantly to edge the handle off of the end of the shaft. Adjacent the forward end of the shaft 1, a transverse slot 9 is formed through which extends the straight shank portion 10 of a curved arm 11, the opposite end of the arm 11 from the shank 10 being formed to provide or having secured thereto a jaw 12, which has a rounded contact surface 13 which normally engages one side face of the blade 2. The shank portion 10 of the arm 11 is secured in the recess 9 by the pivot pin 14 which passes through the shaft 1 in the manner illustrated, and to the free end of the shank portion 10 is pivotally attached the other end of the rod 7. When the arm 11 is in its normal position with the jaw 12 bearing against the blade 2, the handle 5 will be extended to the limit of its movement upon the shaft 1. It will thus be seen that the rod 7 acts to prevent the spring 8 completely shifting the handle 5 from the end of the shaft 1.

Secured to the shaft 1 adjacent the handle 5, is a finger hook 15 which is directed away from the handle 5 and which has an opening or passage therethrough through which the rod 7 passes, the hook thus serving as a guide for this rod and preventing the turning of the handle about the shaft 1.

In the operation of the present device, the same is grasped by the handle 5 and the sharpened edge of the blade 2 is then forced into the earth at an oblique angle and in a direction to pass through and sever the root of the weed which is to be pulled up. At the same time, the handle will be caused to shift forwardly on the shaft 1 and compress the spring 8 and simultaneously shift the rod 7 and oscillate the arm 11 so as to cause the jaw 12 to move away from the blade 2. The top part of the weed will then pass between the jaw and the blade and when the pressure against the handle is removed, the reactance of the spring 8 will cause the jaw to swing back toward the blade and thus clamp the top of the weed against the face of the blade. Upon the user of the implement then pulling back upon or retracting the implement so as to withdraw the blade 2 from the earth, the weed will be readily pulled from the ground and if it is desired to deposit the weed in a receptacle, it may be transferred thereto while it is being held by the jaw 12 and released over the receptacle by the operator engaging the hook 15 with a finger of the hand in which the implement is held and then pulling back upon the hook so as to force the shaft into the handle against the spring. This will cause the jaw to swing away from the blade and will release the weed. If the operator is not concerned with the collecting of the weeds, he may repeat the operation first described to cut the root of another weed and in doing this, the jaw 12 in swinging away from the blade 2, will release the first weed, allowing it to drop upon the ground and the head of the second weed will be engaged so that it will be pulled up when the blade is retracted.

From the foregoing, it will be readily appreciated that an implement of the character herein described greatly facilitates the pulling of dandelions or other weeds so that the removal of the same from lawns or other places where they are not desired will not be the tedious performance which it has heretofore been.

What is claimed is:—

1. An implement of the character described, comprising a shaft, an elongated flat blade extending from one end of the shaft and having its free end edge sharpened, a handle designed to slidably receive the other end of the shaft, resilient means within the handle normally urging the latter away from the received end of the shaft, an arcuate arm having one end pivotally attached to the shaft and having its other end directed toward one side of said blade, and a connection between the said pivoted end of the arm and said handle whereby the movement of the handle under the influence of said spring will effect the shifting of said arm to move the free end thereof toward said blade.

2. An implement of the character described, comprising a shaft, an elongated flat blade extending from one end of the shaft and having its free end edge sharpened, a handle designed to slidably receive the other end of the shaft, resilient means within the handle normally urging the latter away from the receiving end of the shaft, an arcuate arm having one end pivotally attached to the shaft and having its other end directed toward one side of said blade, a connection between the said pivoted end of the arm and said handle whereby the movement of the handle under the influence of said spring will effect the shifting of said arm to move the free end thereof toward said blade, a hook member carried by the shaft adjacent said handle and having an aperture, and said connecting means between the handle and the arm passing through and being guided by the aperture to prevent the rotation of the handle on the shaft.

3. An implement comprising a shaft, an elongated flat blade extending from one end of the shaft and having its free end sharpened, an arcuate arm having a straight end portion passing through an aperture of the shaft, pivotal means securing the straight end portion of the arm to the shaft, the other end of said arcuate arm being directed toward one side of said blade, a cap-like handle slidably receiving the other end of the shaft, spring means in said handle normally urging the same away from the adjacent end of the shaft, and a rod connecting said handle with the free end of the straight end portion of said arm whereby the influence of said spring is exerted to swing the end of the arcuate arm nearest the blade toward the blade.

4. In an implement having a handle shaft, a fixed work element at one end of the shaft and a second work element pivotally mounted at the said end of the shaft for movement relative to the first element, a tubular handle open at one end and receiving therein the other end of said shaft, a rod connecting said tubular handle with said pivotally mounted element whereby movement of the handle longitudinally of the shaft will effect the oscillation of the movable element, a spring housed within the tubular handle between the inserted end of the shaft and the handle and normally urging the handle in one direction relative to the shaft, and a finger hold having a portion secured to said shaft and a portion projecting laterally from the shaft, said laterally projecting portion having an opening therethrough through which said rod passes and by which the rod is maintained against other than longitudinal movement.

FRANK J. CASEY.